(12) United States Patent
Daglow (10) Patent No.: US 12,453,863 B2
(45) Date of Patent: Oct. 28, 2025

(54) APPARATUS AND DEVICE FOR THE ELECTRICAL INTERCONNECT OF IMPLANTABLE DEVICES

(71) Applicant: Terry Daglow, Houston, TX (US)

(72) Inventor: Terry Daglow, Houston, TX (US)

( * ) Notice: Subject to any disclaimer, the term of this patent is extended or adjusted under 35 U.S.C. 154(b) by 186 days.

(21) Appl. No.: 17/131,099

(22) Filed: Dec. 22, 2020

(65) Prior Publication Data

US 2021/0187308 A1    Jun. 24, 2021

Related U.S. Application Data

(60) Provisional application No. 62/952,425, filed on Dec. 22, 2019.

(51) Int. Cl.
   *A61N 1/375*    (2006.01)
   *A61N 1/372*    (2006.01)
   *B33Y 80/00*    (2015.01)

(52) U.S. Cl.
   CPC ....... *A61N 1/3754* (2013.01); *A61N 1/37252* (2013.01); *B33Y 80/00* (2014.12)

(58) Field of Classification Search
   CPC ............. A61N 1/3754; A61N 1/37252; A61N 1/3752; B33Y 80/00; H01R 2201/12; H01R 13/5224; H01R 13/187
   See application file for complete search history.

(56) References Cited

U.S. PATENT DOCUMENTS

| | | | |
|---|---|---|---|
| 9,037,243 B2 | 5/2015 | Sage | |
| 10,149,980 B2 * | 12/2018 | Shah | H01R 13/2421 |
| 10,837,511 B2 | 11/2020 | Carter | |
| 2004/0034393 A1 * | 2/2004 | Hansen | A61N 1/3752 607/37 |
| 2012/0129409 A1 * | 5/2012 | Drew | A61N 1/3752 219/121.64 |
| 2012/0232603 A1 * | 9/2012 | Sage | A61N 1/3752 607/2 |
| 2012/0245657 A1 * | 9/2012 | Lim | H01R 13/639 607/72 |
| 2013/0172949 A1 * | 7/2013 | Stevenson | A61N 1/3754 607/2 |
| 2015/0018909 A1 * | 1/2015 | Rebentisch | H01R 43/16 607/116 |
| 2017/0014635 A1 * | 1/2017 | Villarta | A61N 1/3752 |
| 2017/0100596 A1 * | 4/2017 | Allen | A61N 1/3752 |
| 2020/0238090 A1 * | 7/2020 | Linder | A61N 1/37512 |

* cited by examiner

*Primary Examiner* — James M Kish
*Assistant Examiner* — Jessica L Mullins
(74) *Attorney, Agent, or Firm* — Kearney, McWilliams & Davis, PLLC; William Yarbrough (57) ABSTRACT

A device and means of electrical interconnection and electrical circuit isolation between an implantable stimulation, receiving and/or data transmission lead and a pulse generating or monitoring device. Pulse generating and monitoring devices require an electrical and mechanical interconnection between the stimulation, recording and/or data transmission wires and the active electronic system, each channel or circuit electrically isolated with a high impendence barrier. This device will allow for a rectangular, high-density, unibody, secured, low insertion force connector configuration, increasing the number of connectors and reducing implant size while increasing the number of stimulation and recording channels.

12 Claims, 10 Drawing Sheets

APPARATUS AND DEVICE FOR THE ELECTRICAL INTERCONNECT OF IMPLANTABLE DEVICES

CROSS-REFERENCE TO RELATED APPLICATIONS

This Nonprovisional Application claims priority to U.S. Provisional Patent Application No. 62/952,425 filed Dec. 22, 2019.

FIELD OF THE INVENTION

The present invention includes an apparatus, method and system of use that is directed to a low insertion force, securely fixed and highly robust electrical and mechanical connection for an implantable medical device, generally. Said invention offers a rectangular, individualized coil-spring support structure exhibiting a high density, electrically isolated connection configuration capable of supplying and receiving electrical impulses via discrete lead electrodes providing a compact, modular construction.

BACKGROUND

Implantable electronic stimulation generators or implantable impulse generators (IPGs) consist of a class of devices exhibiting a means to provide stimulation to certain excitable tissues in the human body. These generators may be implanted into various locations about the body in order to supply electrical impulses to receptive muscles and tissues for excitation and regulation including pain modulation, nerve control (e.g., vagus nerve) and stimulation of varied end organs (including the heart, bladder and brain). Further, these same leads can be utilized to receive, monitor and record information (e.g., electric patterns in seizures and deep brain stimulation) which is an opposite yet reciprocal use of transmission in these leads.

The current devices used in electrical stimulation utilize a physical interface which provides an electrical connectivity to implanted electrodes, via stimulation leads, to electricity producing implantable pulse generators. This configuration commonly incorporates a welded "canted coil" placed within a metallic housing and/or a set screw block containing a cylindrical through hole and perpendicular threaded cavity containing a set screw. Specifically, a "canted coil" is a series of wire loops, similar to the loops of a compression spring, that have been flattened in one plane whereby this "flattened coil" is then secured within a cylinder. Disposed at a pre-selected angle, with respect to the centerline, the coil's ends are typically welded together, and the cylinder may then be removed. Moreover, this "canted coil" is normally confined within a defined, typically encapsulating toroidal housing or similar enclosure, whereby said compression spring is halted from expanding past a certain outward radial demarcated confine.

Once the cylindrical stimulation lead (exhibiting discrete contact rings about its proximal end) is inserted into and through the center of its respective welded "canted coil" spring (i.e. generator electrical contact), the coil is pressed (expanded radially outward via the force created by the contact ring) and is flattened into a cylindrical metallic housing thus creating an electrical connection between the stimulation (or recording) lead contact ring and the impulse generator via said metallic housing. An attached wire, onto a metallic housing, or into a non-metallic housing, completes the implantable pulse generator's electronic circuit, whereby the lead body is inserted within one to a plurality of receiving connectors in a terminal (implanted) position and the lead body is transfixed through a securing set screw block and held stationary by advancing the set screw onto the lead body.

The set screw block and set screw mechanism is primarily intended to retain the (1) stimulation, (2) recording and/or (3) data transmission lead by the implantable pulse generator but may also provide an electrical interconnect via a wire attached to the set screw block and the implantable pulse generator electronic circuit.

In order to provide long term electrical connection in a fluid filled environment, i.e., the human body, small silastic seals are placed in between each connector, canted coil and/or set screw block to provide a high impedance electrical barrier once the stimulation leads have been fully inserted and secured.

The current welded "canted coil" technology can only provide a minimum of 0.100" (2.5 mm) center to center interconnect spacing which proves a space utilization defining and limiting aspect wherein limiting space for lead connectors (a) limits the number of connections (and ultimately electrodes) and (b) increases the space required for each additional electrode (thereby increasing the IPG device size).

It is the stated goal of inventor to remedy the historic intractable issues of untenable connector size (i.e., density infirmities in terms of shear connector size) and limited and stymied electrode/connector expansion capabilities (wherein only a set number of connectors may be serviced by one generator). As well it is a goal of inventor to provide for a rectangular, singularized, ergonomic, non-encapsulated, non-confined (open) coil spring "lattice structure" that is (1) a simplistic unibody design which is (2) demonstrably more compact (3) more easily modularized and (4) more readily lending itself to spring repair and/or replacement (via unencumbered access) which lends itself readily to not only ease of manufacture, production and replication (via 3-d printing, additive manufacturing or other like means) but also stratification (stacking), extension and infinite expansion wherein expanded numbers of lead connectors may be provided per lead in less space providing, ultimately and practically, more electrodes from a larger number of leads emanating from a smaller generator device. Moreover, the rectangular frame and resulting design of the present invention more readily lends itself to correct connector orientation when being inserted into an accepting device (as opposed to a circular housing that is mutable into any number of different, and potentially non-functional, arrangements and positions). Too, it is this directed design choice by inventor as to better support and situate each coil spring into its respective proper placement for accepting said lead's (connector ring exhibiting) proximal end.

Although strides have been made to address the need for an impulse generator and receiving lead exhibiting a low insertion force electrical connector with adequate simplicity and requisite compact size to accommodate the need for an increasing number of implanted electrodes from a single, compact device, considerable shortcomings remain. It is therefore desirable to provide an impulse generating and conveying device configured to support an increasingly desired multiplicity of electrodes through high density, serial placement while also recognizing the need for controlling device size. It is the present invention, method and system of use that meets these requirements.

BRIEF SUMMARY OF THE INVENTION

The present disclosure provides an apparatus, method and system of use that discloses an electrical, mechanical connection between an impulse receiving or generating device and implantable connector(s) of an electrical impulse receiving and conveying lead via a low-force, side-loading of one or more secured compression springs ideally held in place in a metallic, 3-D printed uni-body housing.

As disclosed within the present specification and accompanying drawings, the lattice structure (connector housing), which is in the form of a rectangular frame or skeleton for the inclusion and support of parallel, axially co-planar spring coils, may be constructed of a metallic, semi-metallic or non-metallic material which is particularly amendable to a 3D printing process (e.g. Binder Jetting or Laser Sintering), casting, extrusion, injection molding or a similar (or combination of similar) processes whereby a single, unibody coil spring frame is generated. Yet, where, as here, precision is an absolute requirement, 3-D printing provides the greatest degree of requisite reproducible accuracy.

Indeed, 3D printing (i.e., additive manufacturing) processes and similar processes are particularly well suited to the present invention in that these processes can create physical features that otherwise cannot be easily created with conventional machining processes or metal injection molding. Equally, by simplifying the design and construction of the present frame and lattice structure to a unibody design, as opposed to a multi-component and encapsulating housing, the present design finds itself particularly amendable to 3D printing processes to accomplish desired compactness and, most vital, appropriate connector's exacting precision and requisite density.

It is also within the contemplation of inventor that each 3D printing process may use fine metal partials to create a solid or semi-solid metal structure (framed housing) through which an electrical current may be supplied, via incorporated coil springs, to a lead connector and, finally, a discretely defined electrode or another pulse generating or receiving device. Yet, it is within inventor's purview to provide for a frame that is semi-metallic or dielectric.

The stimulation, recording or data transmission lead ring connector, the operable portion of the present invention, itself is a largely rectangular frame constructed to evidence a hollow-centered, structural support, typically, to a series of 2 coil springs—largely in parallel relation to one another—which are made to receive and run perpendicular to an inserted and received lead's outwardly displayed circular ring connectors. Each of these coil springs lies securely coplanar within said frame, much in the same orientation as a vertical window grille, and each consists of a cylindrical axis which is perpendicular to the cylindrical axis of the stimulation lead (running coaxial to the axis of the hollow center of the aforementioned rectangular frame housing). These two or more compression spring(s) is/are positioned equal distance from one another and substantially equidistant to the centerline axis of the frame housing wherein the center axis of the frame housing runs coextensive with the cylindrical axis of the stimulation lead. Each of the largely parallel coil springs, being cylindrical in nature, themselves exhibit axes that run in the same axial plane with the frame when inserted into said frame housing.

The frame itself exhibits protrusions above and below the centrally deposed hollow core of said frame whereas each protrusion acts as (1) a semi-circular, convex receiving guide for the concave, tubular inserted lead and (2) as a support to separate each coil spring. On either side of each protrusion lay either depressions, posts or a combination thereof (depressions with inserted posts) with which to hold and secure each coil spring and to support said coils at rest and during radial outward movement (upon lead insertion).

In one embodiment said depressions themselves are sufficient to hold and secure said coil springs wherein the coil springs diameter is less than the thickness of the securing frame (i.e., in the thicker framed invention). In another embodiment, said posts are supported laterally on each end wherein the coil spring is "sandwiched' between a centrally deposed protrusion and an outwardly deposed shelf wherein said coil springs diameters may be less than, equal to or more than the thickness of the frame (e.g., in a thinner framed invention). Additionally, if each coil spring were bifurcated longitudinally, at its midpoint, each coil spring may be seen to be provided open space both within the centrally deposed hollow core of the frame, for acceptance of lead insertion, and on corresponding, opposite right and left sides of each coil spring (away from the hollow center) for spring coil expansion (radially) thus providing outward relief required from lead insertion where said housing will provide physical clearance for the side loading deformation and outward V-shape (i.e. visually a "<" and ">" shape).

Functionally, the mating of the (male) stimulation lead and the (female) hollow core of the connector frame, radially influences the compression spring(s) of the connector, deforming the linear cylindrical axis of the compression spring away from the inserted lead resulting in large radii or a V-shape (i.e. visually a "<" and ">" shape), from the center of the coil spring, wherein the V-shape has roughly equal distance on either side of the V-shape vertex as the coil springs expand outward, radially, as to both accommodate and receive the outer diameter of said leads diameter and correspondingly rounded connector. Namely, one discrete coil-spring connector mates to exactly one reciprocal rounded connector in series wherein connectors are positioned linearly one behind the next whereby an inserted lead traverses the hollow core of each subsequent connector. The coil spring assisted housing will thus hold the compression spring(s) as the stimulation lead is inserted through the center axis of the housing causing the compression spring to deform outwardly and capture or "grip" each connector ring. This connection, in turn, supplies energy to exactly one pathway which is terminally connected to exactly one implanted electrode, medical device or distal terminal contact. The creation of each distinct pathway to a designated position on a nerve or tissue, represents a singular track which is repeated for each 'connector-lead-electrode' pathway where the number of discrete pathways is regulated by the density of connectors available to make to said lead/electrode associations. Each connector may also be separated and insulated from the next adjacent connector by a dielectric separator/insulator.

The width of the housing is to range from 0.020 inch to 0.060 inch, 0.25 mm to 1.5 mm, depending on physical requirements and number of connections sought. The width and spring orientation represents the distance parallel to or in-line with the housing center axis and designation of depression, post (boss) or depression-post configurations.

The compression spring coil diameter ranges from 0.013 inch to 0.060 inch, 0.3 mm to 1.5 mm, yet may include a variable or varying coil diameter wherein some embodiments may include a uniform diameter and other embodiments may include alternating diameters within the same coil spring. For example, the central midpoint of a coil spring (dissected longitudinally), at an area corresponding with the frame's hollow center, may exhibit a coil spring diameter (involving one to a plurality of individual spring coils) that is smaller than its abutting coil spring sections as to better accept and "grip" an inserted lead. This is equally true of coil pitch or angle, although, as in the case of a canted coil, this is but one a series of possible modifications.

Too, compression spring wire cross section geometry is not relegated to a cylindrical form but can be round, square, rectangle, round with a flattened plane, oblong or any other conceivable cross-sectional geometry or any combination thereof.

And each coil could, as well, use one to a number of these modifications even within and on the same coil as necessity dictates.

In terms of position, the compression spring coil distance from the housing center axis is to range from 0.000 inch to 0.040 inch, 0 mm to 1 mm. The compression spring can be assembled into the metallic housing in a free state, loosely attached or floating within the frame and housing constraints, uncompressed or even slightly, moderately or heavily compressed.

In addition to the housing containing full depressions, or partial depressions to capture one or more compression springs from falling out or being dislodged while the stimulation lead is being axially inserted through the housing center axis, the housing could also incorporate posts, or bosses, positioned to insert into the center end of each compression spring, within a depression or alone, in one end or both ends of the compression spring. It may be that the spring has a uniform means of securing each of its ends or, alternatively, differing means of securing and/or compressing said spring on either end (depression, posts, a combination of depressions and posts or any combination thereof).

Figure 1:
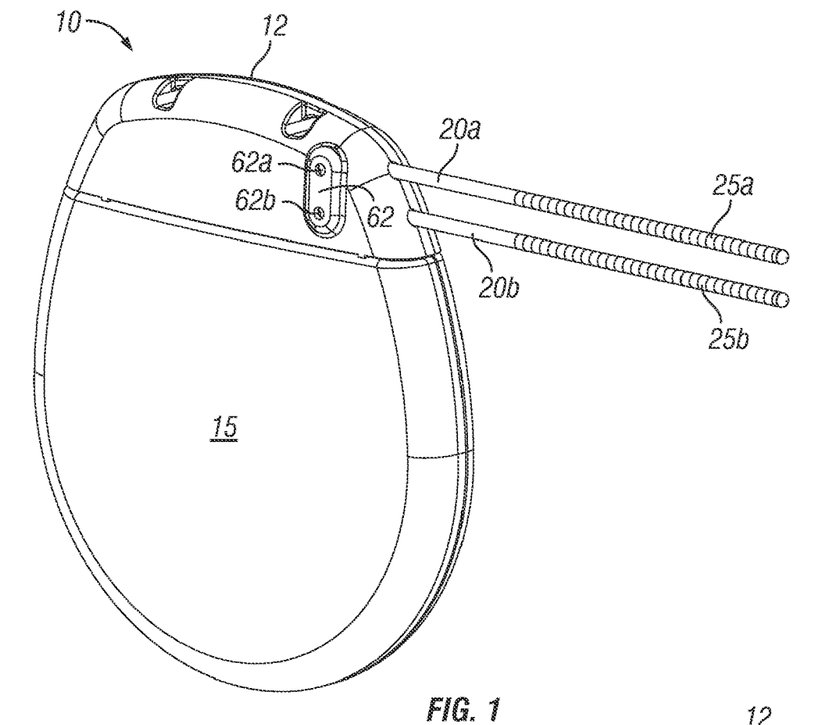
FIG. 1. shows an isometric view of the front side of a 32-channel implantable medical device and leads.
Figure 2:
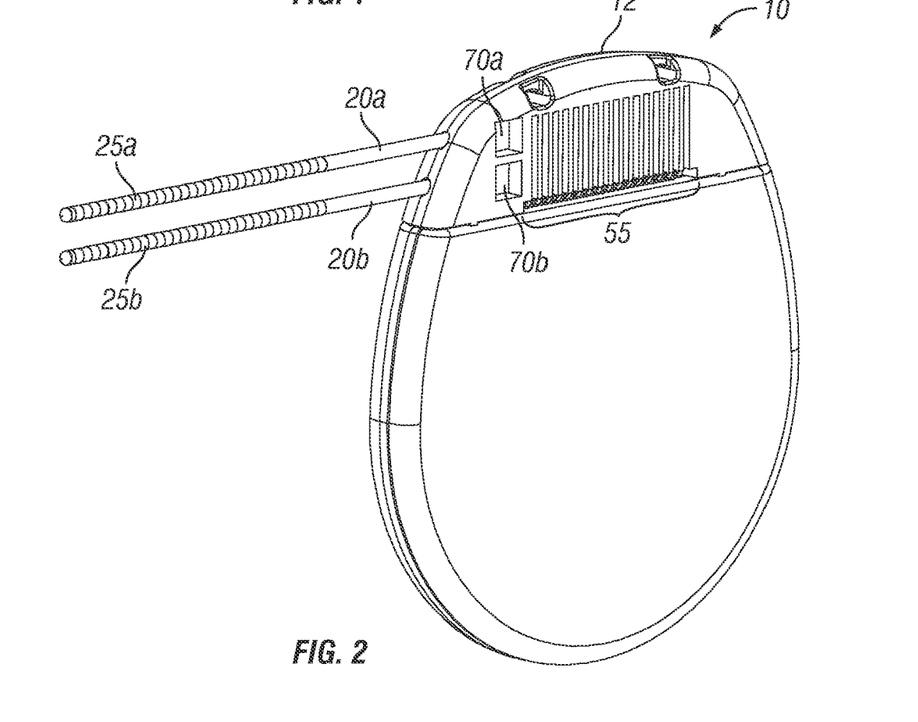
FIG. 2. illustrates an isometric view of the back side of a 32-channel implantable medical device and leads.
Figure 3:
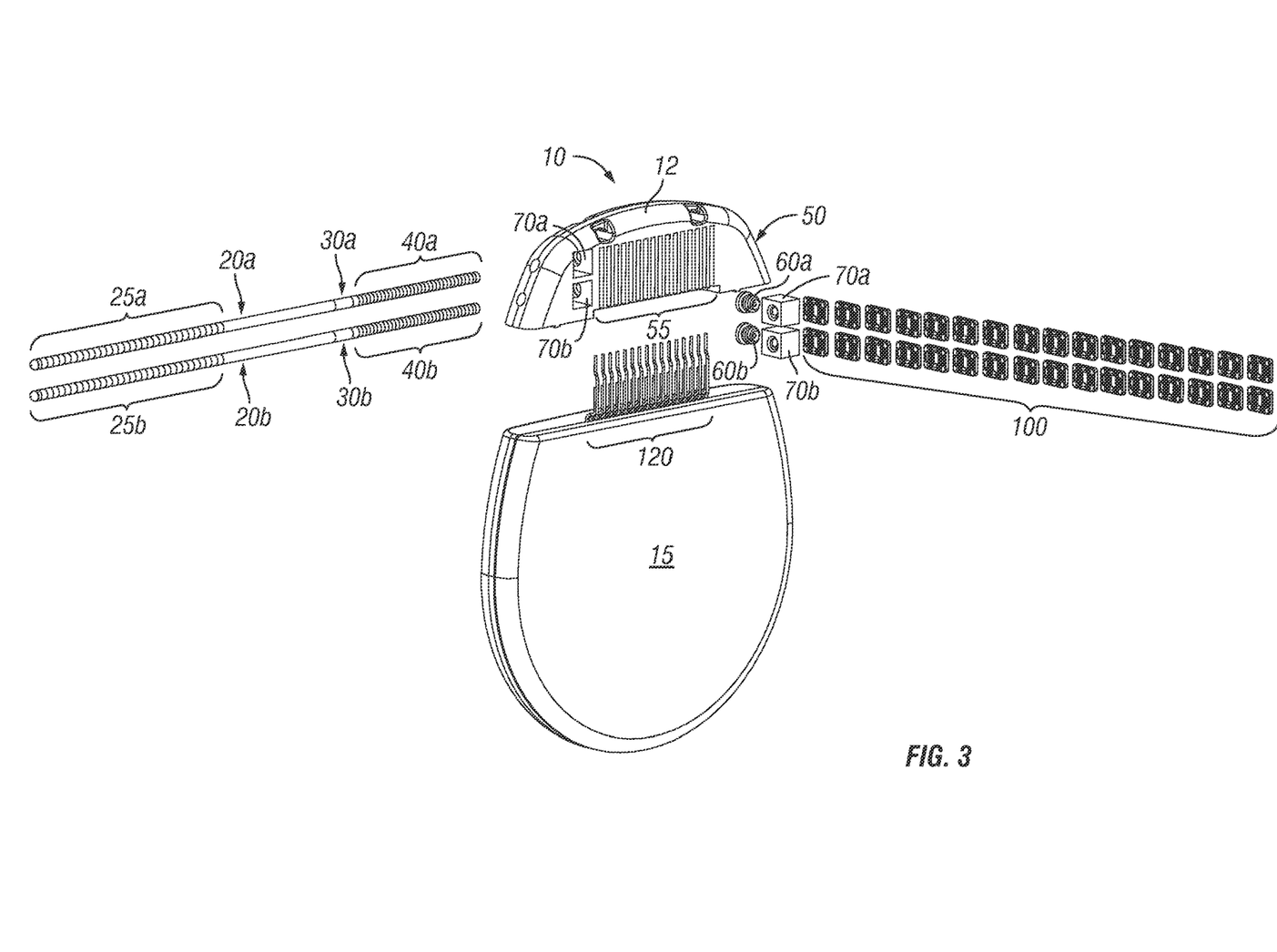
FIG. 3 displays an isometric exploded view of the back side of a 32-channel implantable medical device and leads of FIG. 2.

Too, the device itself contains novel features wherein the aforementioned connector width and resulting ability to provide an increased number of connections translates into the potential for multiple lead connectors per device which may be stacked (with an upper and lower lead insertion points as shown in FIGS. 1-3), conglomerated and/or located in various conformations and configurations all in one device. And, whereas depicted herein, stacking manifestly doubles the capacity of a pulse generating or monitoring device, this is merely representative and is not intended to limit the number and position of connectors—which could be exponentially arranged and rearranged—given the current potential for connector expansion, the number of connectors a device may support, the decreased space required, increased capacity for modular expansion as well as resultant decreases in device size requirements.

In terms of the functional components of the generating and monitoring device, the present invention exhibits additional key features aiding in its operation including, set screw securing blocks and seals. The former set screws securing blocks and screws work to secure inserted leads providing a mechanism for reversibly securing inserted leads into said device. The later insulating seals provide two proportionately advantageous elements to the present device wherein said seals allow for (a) proper connector placement and securing and (b) an insular barrier between connectors which serve to ensure the discrete conveyance or reception of signals without fear of interference from an adjacent connector.

BRIEF DESCRIPTION OF THE DRAWINGS

Novel features characteristics of the application are set forth in the appended claims. However, the application itself, as well as a preferred mode of use, and further objectives and advantages thereof, will best be understood by referencing the following detailed description when read in conjunction with the accompanying drawings, wherein:

And while the device, system and method of use of the present application is susceptible to various modifications and alternative forms, specific embodiments included herewith have been shown by way of example in the drawings and are herein described in detail. It should be understood, however, that the description, describing specific embodiments, is not intended to limit the application to the particular embodiment disclosed, but on the contrary, the intention is to cover all modifications, equivalents, and alternatives falling within the spirit and scope of the present application as defined by the appended claims read in context of the disclosure.

DETAILED DESCRIPTION AND BEST MODE OF IMPLEMENTATION

Illustrative embodiments of preferred embodiment are described below and depicted in the figures. It must be appreciated that in the development of any preferred embodiments, numerous references are made to the spatial relationships between various components and to the spatial orientation of various aspects of components as the devices depicted in the appended drawings. However, as will be recognized by those skilled in the art after a complete reading of the present application, the devices, members, and apparatuses described herein may be positioned in any desired orientation which addresses the above deficiencies of the prior art. Thus, the use of terms to describe a spatial relationship between various components or to describe the spatial orientation of aspects of such components (e.g. lead connectors, lead electrodes, impulse generating devices, coil springs and the like) should be understood to describe a relative relationship between the components or a spatial orientation of aspects of such components, respectively, whereas the device described herein may be oriented as to provide an ergonomic, rectangular and compact uni-body lead connector construct that is designed explicitly for low-force lead insertion, high-density and compacted arrangements providing for increased connector capacity, enhanced modulation and connector expansion leading to a smaller impulse generator device footprint.

The present invention will be understood by those having skill in the art, both as to its structure and operation, taken in conjunction with the accompanying description and drawings. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate.

Referring to FIG. 1, FIG. 1 illustrates a medical implant device 10 consisting of an electrical interconnect system 12, consisting of internalized implantable pulse generator electronics 15 and two 16-channel stimulation/recording leads 20 (evidenced as 20a and 20b). FIG. 1 exhibits upper and lower stimulation/recording leads 20a and 20b which are held securely within electrical interconnect system 12 through insertion of set screw placement 60 of set screws 60a and 60b (See FIG. 3) through upper and lower apertures 62a and 62b of externally residing set screw guide 64.

FIG. 2 provides for a reverse view of FIG. 1 wherein upper stimulation/recording lead 20a and lower stimulation/recording lead 20b are seen to pass through set screw block 70a and 70b, respectively, and into electrical interconnect system 12.

FIG. 3, shows an exploded view of FIG. 2, displays two 16-channel stimulation/recording leads 20a and 20b, a truncated set of stimulation electrodes 25a and 25b, set screw bands 30a and 30b, interconnect bands 40a and 40b, which are inserted into electrical interconnect system 12, connector housing 50, secured by set screws 60a and 60b and upper set screw blocks 70a and lower set screw block 70b, through each side load spring contact assembly 100, which corresponds to exactly one feedthrough wire 120 and into the internalized portion implantable pulse generator electronics 15. And while each side load spring contact assembly 100 may be seen removed from the connector housing 50 in FIG. 3 in the exploded view, it is to be understood that each side load spring contact assembly 100 is placed and secured into designated receiving slots, above and below, wherein contact stimulation electrodes 25a and 25b reside on lead 20a and 20b. It may be noted that the distal end of recording and stimulation lead 20a, 20b may as well be another medical stimulation or recording device.

Figure 4A:
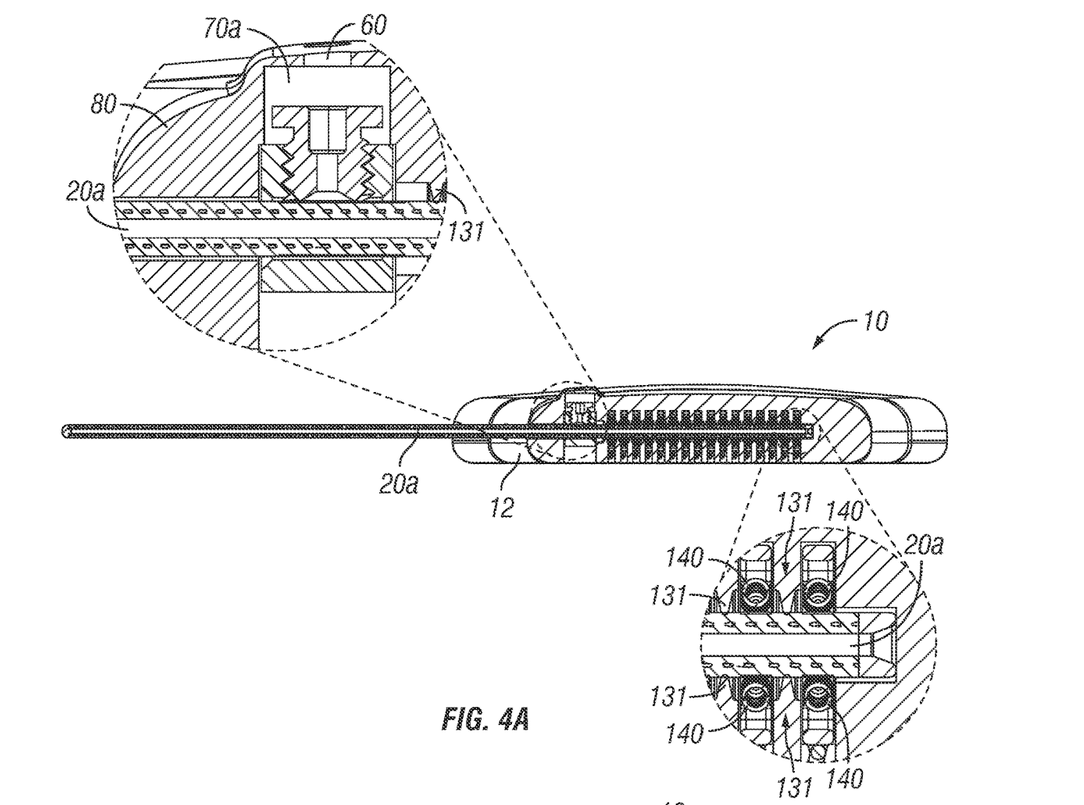
FIG. 4a shows a top view of the of a 32-channel implantable medical device and leads wherein the top half of the connector assembly has been sectioned to show the internal components and certain sections have been enlarged to show detail.
Figure 4B:
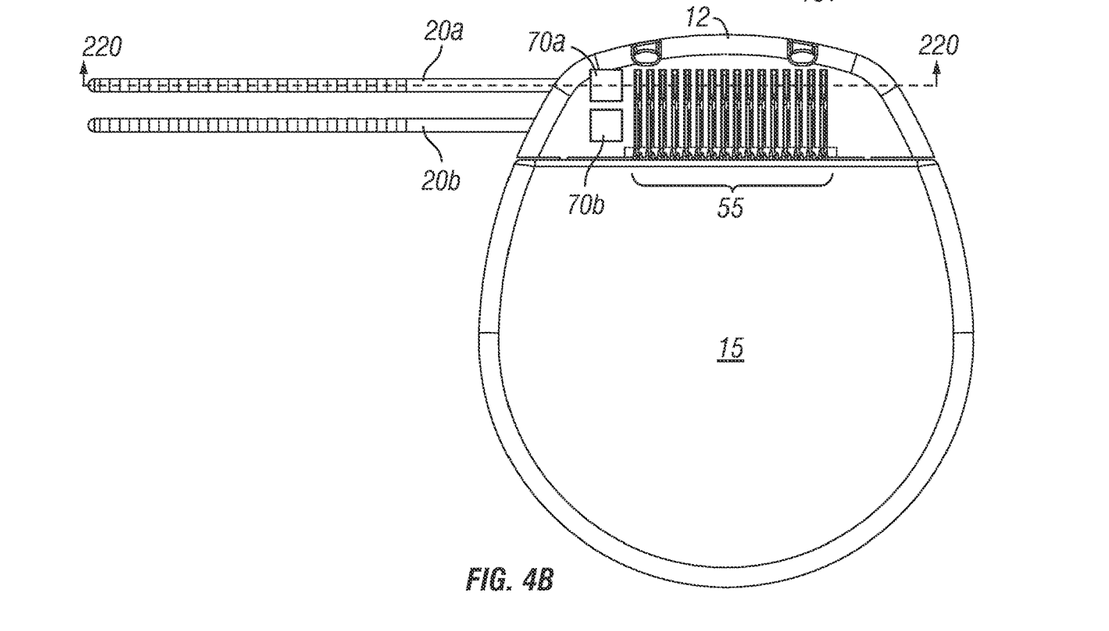
FIG. 4b exhibits a lead axis and perpendicular orientation of lead connectors in series.

FIG. 4a illustrates a top view neurostimulation system 10 and FIG. 4b a side view showing medical implant device 10 and a 32-channel neurostimulation system with two 16-channel stimulation/recording leads 20 inserted and held in place by the tightening of the sets screws 60 and upper set screw block 70a against a set screw band.

Referring to FIG. 4a, FIG. 4a displays a (a) top view, and two exploded views: (b) top left set screw sectional view and (c) bottom right connector/lead sectional view showing a neurostimulation system 10 encompassing two 16-channel stimulation/recording leads, 20a visible and 20b beneath 20a, whose insertion causes each side load spring contact 140 to deform in an outward manner as a mechanical and electrical connection is created between an interconnect band 40a, corresponding to the 16-channel stimulation/recording lead 20a, and interconnect band 40b, corresponding to the 16-channel stimulation/recording lead 20b, whereby the implantable pulse generator electronic system 15 supplies and receives impulses via attached feedthrough wires 120 (see FIG. 3) into receiving slots 55. Receiving slots 55 evidencing an upper and lower set of connectors 100 (see FIG. 4b below) and insulator seals 131 placed between side load spring contact 140.

Figure 5A:
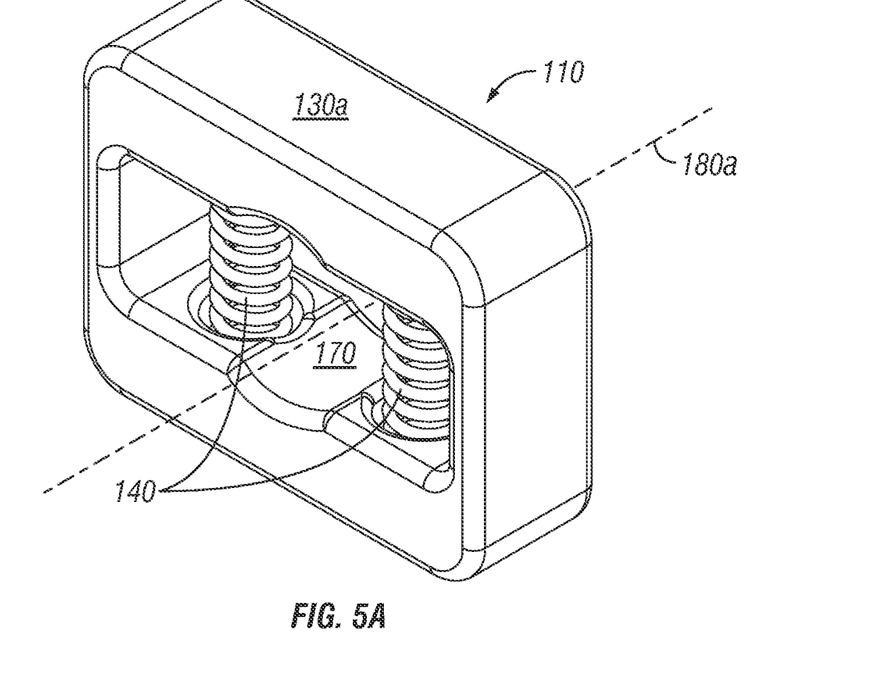
FIG. 5a is an isometric view of the "thick" rectangular dual spring side loading connector assembly utilizing securing depressions and/or posts.

Referring to FIG. 4b, FIG. 4b depicts a side detailed view showing 2 leads 20a, 20b of a 32-channel neurostimulation system 10 with two 16-channel stimulation/recording leads 20 inserted through screw set 70a and 70b, respectfully and through individual hollow cores 170 of connectors 100 (depicted supra in FIG. 4A and infra in FIGS. 5A and 5B) along axis 220 and 222 in FIG. 5A. FIG. 4B additionally shows insulator seal 131 placed between spring contacts 100 (See as well FIG. 3) of receiving slots 55 in a largely connector 100-seal 131-connector 100-seal 131 configuration. Insulator seal 131 creates a high impendence electrical path between spring contacts 140 and set screw block 70a (also shown in top left of FIG. 4a). The insulator seal 131 is an integral part of the connector housing's interior 80 or may be a separate component assembled into connector housing 12. The width of seal 131 can range from 0.050 inch (1.27 mm) to 0.005 inch (0.127 mm). The spacing between spring contact 140 to spring contact 140 can range from 0.050 inch (1.27 mm) to 0.005 inch (0.127 mm). The spacing between spring contact 140 to set screw back 70 can range from 0.050 inch (1.27 mm) to 0.005 inch (0.127 mm). Seal 131 is a compliant or flexible material such as silicone rubber, urethane or a combination of other flexible materials.

Figure 5B:
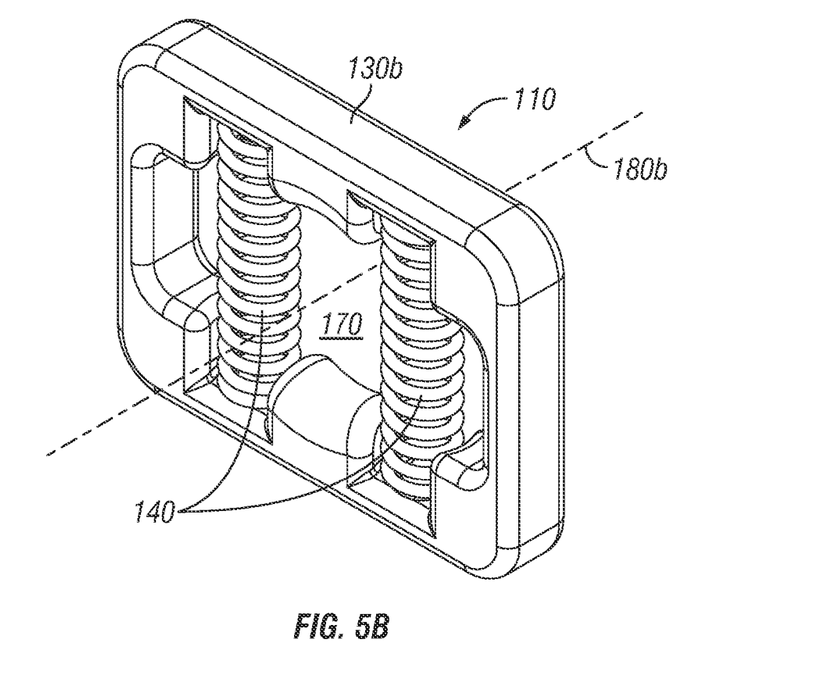
FIG. 5b depicts an isometric view of the "thin" rectangular dual spring side loading connector assembly utilizing securing posts.

Referring now to FIG. 5a, 5b, 6a and 6b, two possible versions of the side load spring contact assembly 110 is exhibited where the side load spring contact 140 captured by the housing frame 130a is held and secured by depressions 132 and 133 (which may also harbor securing posts 136 and 137, respectively) and 130b showing side load spring contact 140 held and may be secured by posts 138 and 139, respectively. The center axis 180a through the hollow core 170 of housing frame 130a in FIG. 5a represents the ultimate receptacle of the cylindrical axis 220 (see FIG. 4), running coaxially, of the 16-channel stimulation/recording lead 20. The center axis 180b through the hollow core 170 of housing frame 130b in FIG. 5b represents the ultimate receptacle of the cylindrical axis 220 (see FIG. 4), running coaxially, of the 16-channel stimulation/recording lead 20.

Figure 6A:
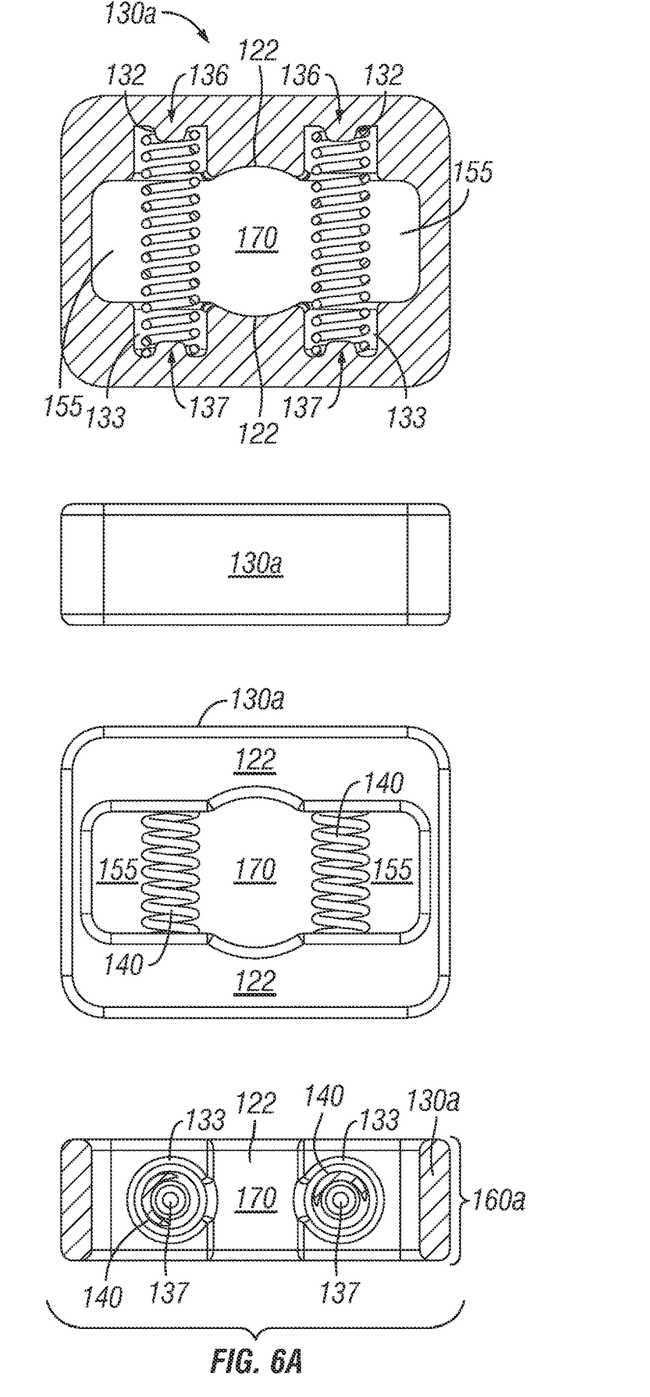
FIG. 6a shows the orthographic view of a "thick" rectangular dual spring side loading connector assembly with inserted coil spring.
Figure 6B:
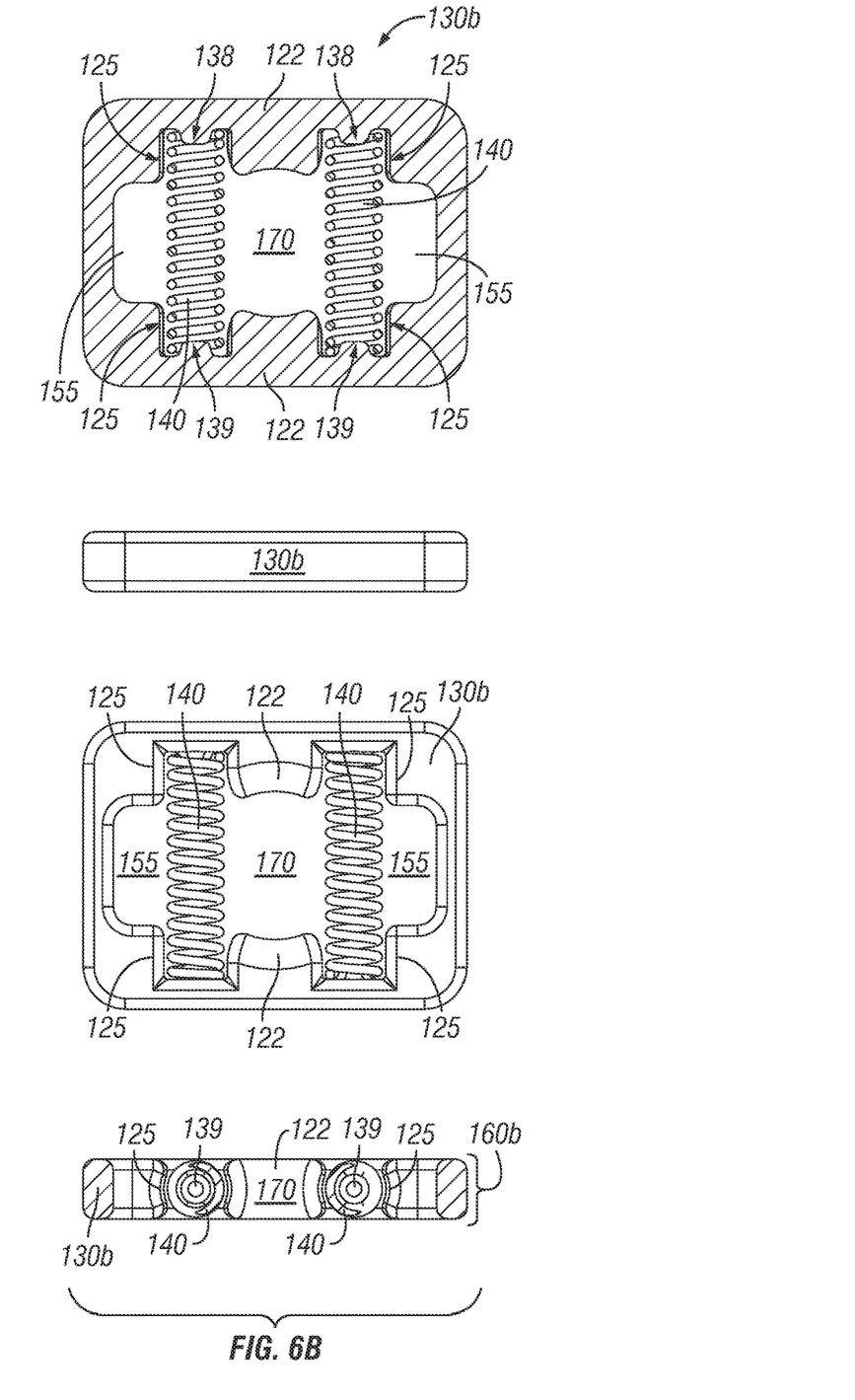
FIG. 6b shows the orthographic view of a "thin" rectangular dual spring side loading connector assembly with inserted coil spring.

Referring now to FIG. 6a and FIG. 6b, a side, top and sectional view show the two possible versions of FIG. 5a (thick 130a) and FIG. 5b (thin 130b) where FIG. 6a exhibits housing frame 130a harboring depressions 132 and 133 and posts 136 and 137 and FIG. 6b exhibits posts 138 and 139. The thickness (130a) or thinness (130b) of the side load spring contact 140 and the housing frame 130 is illustrated by 160a and 160b at the bottom figures of FIG. 6a and FIG. 6b, wherein this width 160b of connector 130b may range from 0.013 inch to 0.060 inch (0.3 mm to 1.5 mm). The distance of the side load spring contact 140 from the center axis 180a and 180b is illustrated by distance 150, wherein this distance may range from 0.000 inch to 0.040 inch (0 mm to 1 mm).

Further evidenced are side recess spaces 155 allowing for side load spring contact 140 movement outward and radially into said recess space 155 (as further depicted in FIGS. 8 and 9 upon insertion of lead 20) as well as upper and lower lead 20 guiding and side load spring contact 140 support protrusions 122 on each interior side of each side load spring contact 140 end and reciprocal demarcating shelf features 125 on each exterior 140 end of frame 130b. And whereas 130b requires a shelf 125-post 138, 139-convex protrusion 122 support structure, 130a's circular depressions 132, 133 serves as side load spring contact 140's end placement and support. Representationally, from top to bottom, both housing frame 130a (thick, left) and 130b (thin, right), are represented as (a) a lateral cross section, (b) a top view, (c) a side view and (d) a horizontal cross section.

Figure 7A:
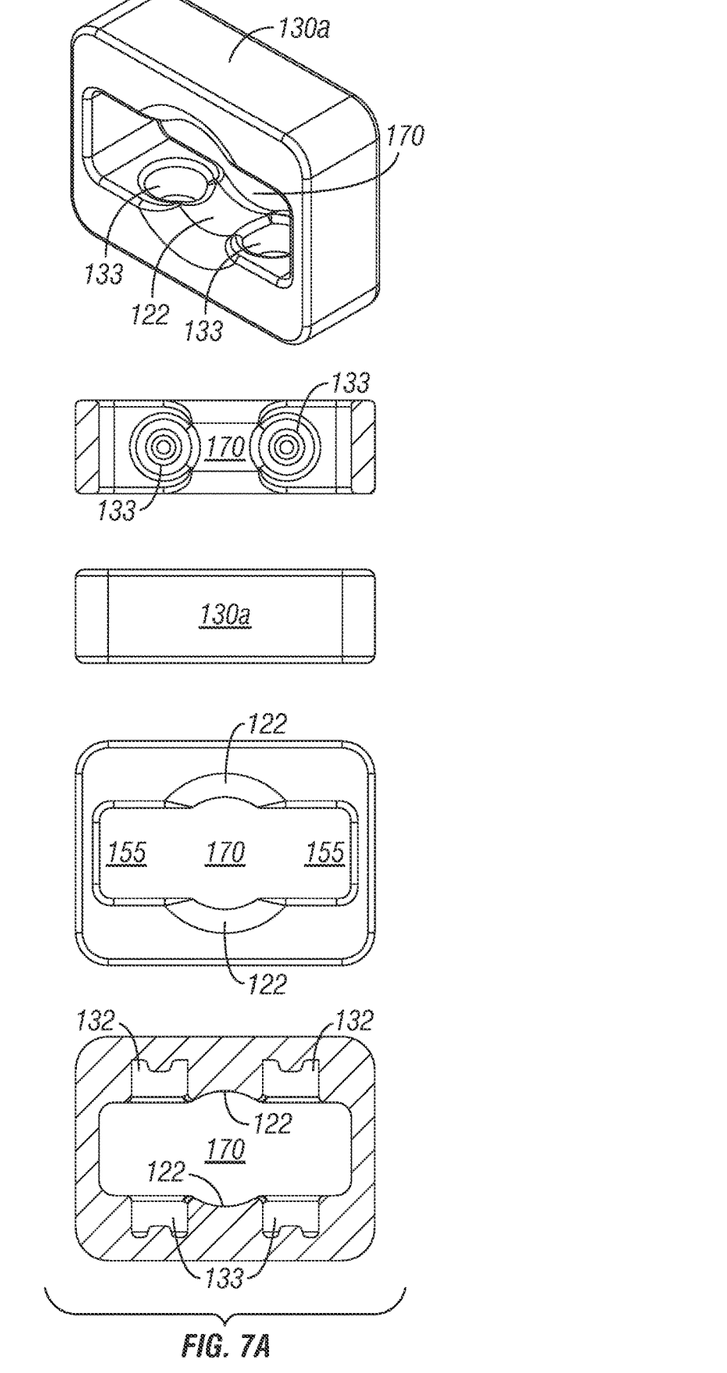
FIG. 7a shows the orthographic and isometric views of a "thin" rectangular dual spring side loading housing without an inserted coil spring.
Figure 7B:
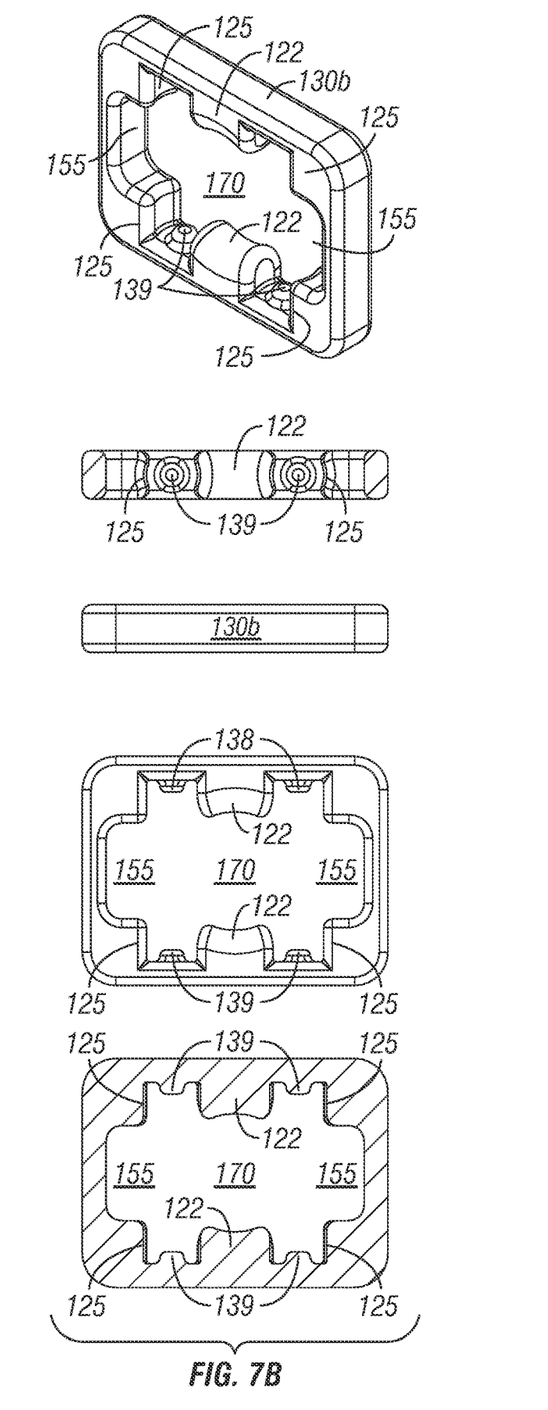
FIG. 7b shows the orthographic and isometric views of a "thick" rectangular dual spring side loading housing without an inserted coil spring.

FIGS. 7a and 7b are a sectional view showing the two possible versions of FIGS. 5a and 5b and FIG. 6a and FIG. 6b (each featuring 130a and 130b), respectively, with the side load spring contact 140 removed in FIGS. 7a and 7b. The housing 130a contains a depression 133 to hold and secure the side load spring contact 140 as illustrated in FIG. 7a. The housing 130a contains a recess 200 to accommodate the displacement of the side load spring contact 140 (not shown) as the 16-channel stimulation/recording lead 20 is inserted into the side load spring contact assembly 130a. To further aid the capture of the side load coil spring 140 contact within housing 130a one or more post 136-139 (FIG. 6a and FIG. 6b) maybe added providing proper placement and securing with and without depressions 132 and 133.

Figure 8:
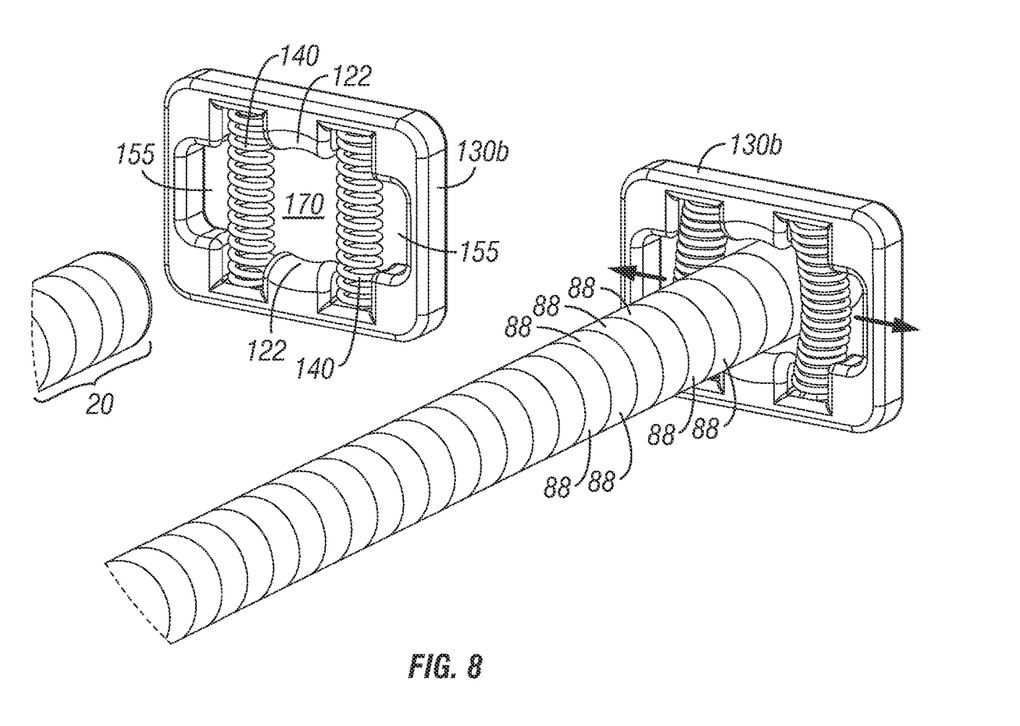
FIG. 8 shows the isometric views of two partial 16 channel neurostimulation leads and the dual side loading connector assembly, before engagement, spring coils largely parallel (left), and after engagement (right), spring coils deformed radially outward in an exploded view of FIG. 9.
Figure 9:
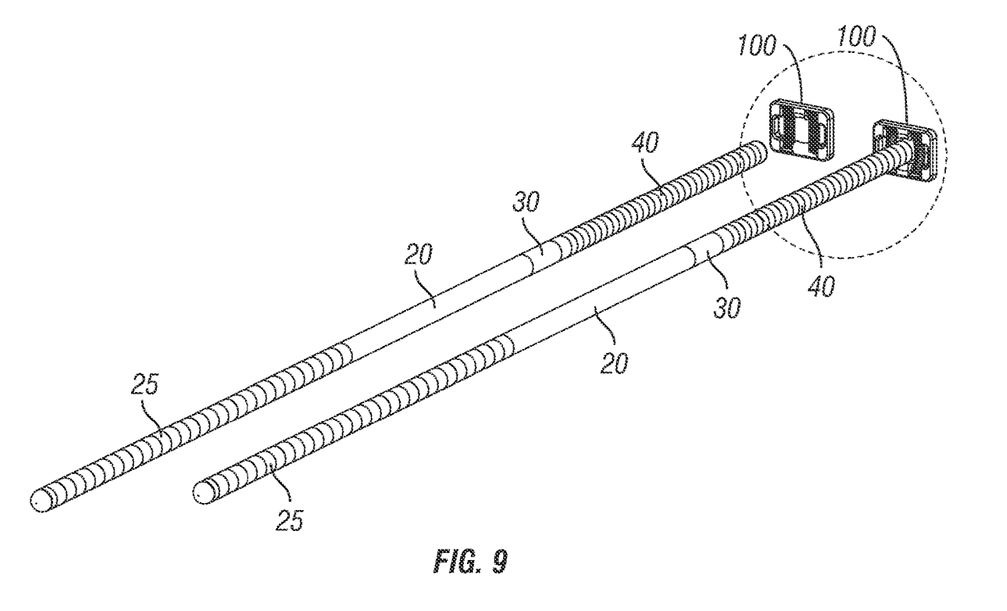
FIG. 9 shows the isometric views of two full 16 channel neurostimulation leads and the dual side loading connector assembly, before engagement, spring coils largely parallel (left), and after engagement (right), spring coils deformed radially outward.

Referring to FIG. 8 and FIG. 9 an isometric view of the present invention before inserting the 16-channel stimulation/recording lead 20 exhibiting connector lead rings 88 into the side load spring contact assembly 110 and an isometric view of after the 16-channel stimulation/recording lead 20 is inserted into the side load spring contact assembly 110 (thin 130b) showing the first interconnect band (ring) 40 making contact with side load spring contact 140 resulting in deformation 150 outward (indicated by both right and left arrows).

Figure 10:
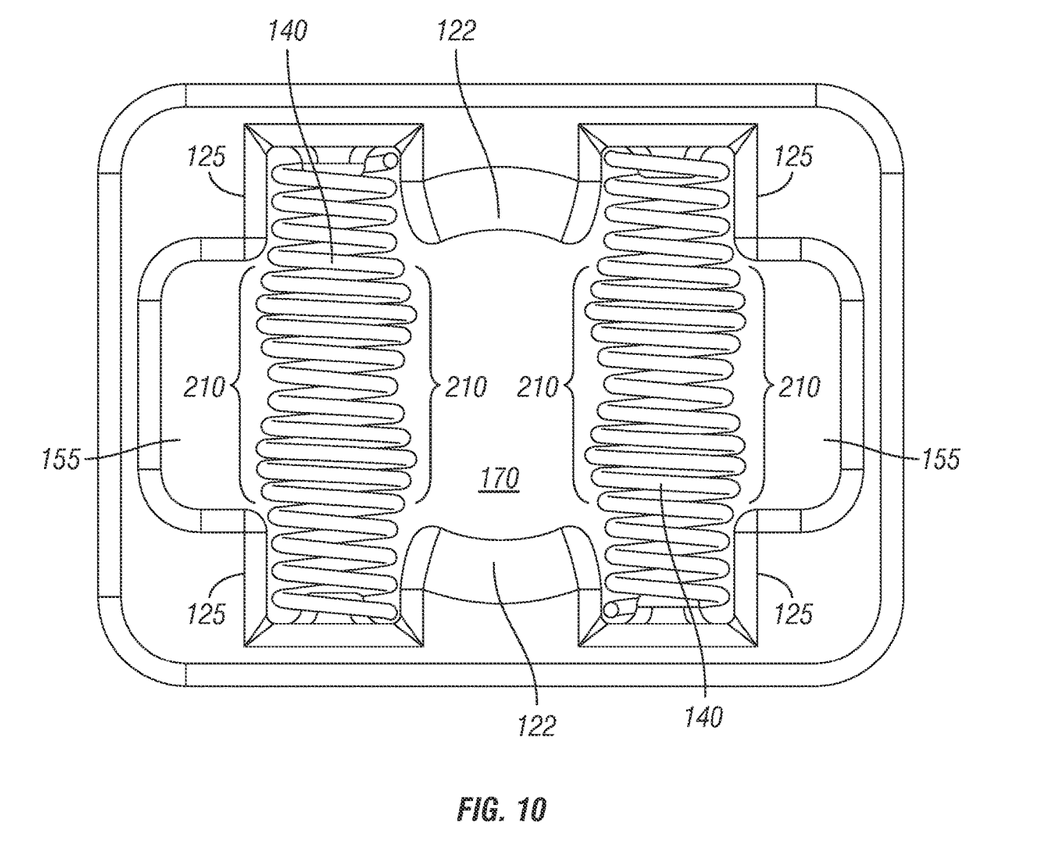
FIG. 10 exhibits coil springs of varying diameters as to better accommodate lead insertion.

Referring to FIG. 10, side load spring contact assembly 130b shows the use of variable coil pitch and coil diameters 210 of the side load spring 140 of side load spring contact 130b as to better accommodate and secure stimulation/recording leads 20 insertion.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

I claim:

1. An electrical contact connector for electrically coupling a lead contact ring or plurality of lead contact rings of a stimulation, recording and/or data transmission lead to an active implantable medical device, said electrical contact connector comprising:
   a unibody housing having a hollow center for reception of said stimulation, recording and/or data transmission lead;
   said hollow center exhibiting a center axis made to run coaxially with a centrally deposed axis of said stimulation, recording and/or data transmission lead;
   said unibody housing exhibiting integrated, internal upper and lower depressions, each containing securing posts, for internalized positioning and securing of a set of two coil springs that are parallel;
   said set of parallel coil springs exhibited coplanar within said unibody housing;
   said set of parallel coil springs and said unibody housing configured to be oriented perpendicular to said stimulation, recording and/or data transmission lead;
   said each coil spring having a first and second open end:
      said first and second open ends positioned into integrated, internal upper and lower depressions and onto stabilizing posts, centrally within each coil spring end;
   said unibody housing exhibiting internal side recesses for outward radial expansion of said each coil spring of said set of parallel coil springs upon side load spring contact via stimulation, recording and/or data transmission lead insertion;
   each coil spring of said set of parallel coil springs made to at least partially extend into said hollow center and made to accept said lead contact ring; and
   said set of parallel coil springs made to accept exactly one lead contact ring.

2. The electrical contact connector of claim 1, wherein unibody housing is manufactured via an additive process to be metallic, non-metallic, or a combination thereof, materials amendable to 3-D printing processes.

3. The electrical contact connector of claim 2, wherein said unibody housing is metallic, non-metallic, or a combination thereof, and is constructed using additive manufacturing.

4. The electrical contact connector of claim 1, wherein the exhibited depressions, posts, or a combination thereof, secure and position said set of parallel coil springs.

5. The electrical contact connector of claim 1, wherein each coil spring of said set of parallel coil springs may exhibit varying diameters, varying pitches, or a combination thereof, per individual coil spring.

6. The electrical contact connector of claim 4, wherein said set of parallel coil springs are cylindrical, square, octagonal, or a combination thereof, made to conform to said hollow center and said depressions, posts or a combination thereof.

7. An electrical contact connector for electrically coupling a lead contact ring or plurality of lead contact rings of a stimulation, recording and/or data transmission lead to an active implantable medical device, the electrical contact connector comprising:
   a unibody housing having a hollow center for reception of said stimulation, recording and/or data transmission lead;

said hollow center exhibiting a center axis made to run coaxially with centrally deposed axis of said stimulation, recording and/or data transmission lead;

said unibody housing exhibiting upper and lower securing posts for internal positioning and securing of each coil spring of a set of parallel coil springs;

said set of parallel coil springs exhibited coplanar with said unibody housing;

said set of parallel coil springs and said unibody housing configured to be oriented perpendicular to said stimulation, recording and/or data transmission lead;

said each coil spring having a first and second open end:

said first and second open ends positioned onto stabilizing posts, centrally within each coil spring end;

said unibody housing exhibiting internal side recesses for acceptance of radial expansion of each of said parallel coil spring upon lead insertion and side load spring contact;

each coil spring of said set of parallel coil springs is made to at least partially extend into said hollow center and is made to accept said stimulation, recording and/or data transmission lead contact ring; and where each coil spring set is made to accept exactly one lead contact ring.

8. The electrical contact connector of claim 7, wherein unibody housing is metallic, non-metallic, or a combination thereof, and is constructed using additive manufacturing.

9. The electrical contact connector of claim 7, wherein each parallel coil spring set may have varying diameters, varying pitches, or a combination thereof, per individual coil spring.

10. The electrical contact connector of claim 7, wherein said parallel coil spring set is cylindrical, round, square, rectangle, round with a flattened plane, oblong, or any combination thereof.

11. The electrical contact connector of claim 10, wherein the depressions, posts, or a combination thereof, corresponding with said each coil spring of said set of parallel coil springs are of a reciprocal shape for receiving said each parallel coil spring.

12. The electrical contact connector of claim 7, wherein each electrical contact connector is positioned in series, parallel to one another to provide high density modularization and stacking.

* * * * *